US010628535B2

(12) United States Patent
Mitchell et al.

(10) Patent No.: US 10,628,535 B2
(45) Date of Patent: Apr. 21, 2020

(54) COMPLETE ENERGY ANALYTICAL MODEL BUILDING INFORMATION MODELING (BIM) INTEGRATION

(71) Applicant: Autodesk, Inc., San Rafael, CA (US)

(72) Inventors: John William Mitchell, Hartsdale, NY (US); Ian Patrick Molloy, Waltham, MA (US)

(73) Assignee: AUTODESK, INC., San Rafael, CA (US)

( * ) Notice: Subject to any disclaimer, the term of this patent is extended or adjusted under 35 U.S.C. 154(b) by 523 days.

(21) Appl. No.: 15/091,321

(22) Filed: Apr. 5, 2016

(65) Prior Publication Data

US 2016/0299997 A1    Oct. 13, 2016

Related U.S. Application Data

(60) Provisional application No. 62/144,028, filed on Apr. 7, 2015.

(51) Int. Cl.
*B29C 35/02* (2006.01)
*G06F 17/50* (2006.01)
*F24F 11/46* (2018.01)

(52) U.S. Cl.
CPC .......... *G06F 17/5004* (2013.01); *F24F 11/46* (2018.01); *G06F 17/5009* (2013.01); *G06F 2217/16* (2013.01)

(58) Field of Classification Search
CPC ............. G06F 17/5004; G06F 17/5009; G06F 2217/16; F24F 11/46; F24F 2011/0075
See application file for complete search history.

(56) References Cited

U.S. PATENT DOCUMENTS

| 2008/0120068 A1 | 5/2008 | Martin et al. |
| 2008/0120069 A1 | 5/2008 | Martin et al. |
| 2013/0066473 A1 | 3/2013 | Smith et al. |
| 2013/0085718 A1* | 4/2013 | Bernhardt ........... G06F 17/5004 703/1 |

(Continued)

OTHER PUBLICATIONS

Eric Turner "Watertight Planar Surface Meshing of Indoor Point-Clouds with Voxel Carving" (Year: 2013).*

(Continued)

*Primary Examiner* — Timothy A Mudrick
(74) *Attorney, Agent, or Firm* — Gates & Cooper LLP

(57) ABSTRACT

A method and system provide a complete energy analytical model. An input model is acquired and consists of a combination of architectural building elements (ABEs) and conceptual massing elements (CMEs). The input model is pre-processed by extracting information from both the ABEs and the CMEs, and constructing virtual elements that encapsulate the extracted information. A discrete set of points in three-dimensional (3D) space that is distributed over boundary faces of the ABEs or CMEs is determined. The discrete set of points is used to provide a representation of the input model that is used in combination with a 3D cubical grid (a voxel grid) to analyze a spatial structure of the input model. A two-dimensional (2D) discrete approximation of the geometry of the input model is used to determine surfaces of the energy analytical model which is then output.

11 Claims, 8 Drawing Sheets

(56) References Cited

U.S. PATENT DOCUMENTS

2013/0197868 A1    8/2013  Olsson et al.
2014/0180996 A1*   6/2014  Kulusjarvi .............. G06N 5/00
                                                   706/47

OTHER PUBLICATIONS

L. Díaz-Vilariño et al. "As Built BIM with shades modeling for energy analysis", pp. 353-359 (Year: 2012).*
Seongchan Kim et al. "Analysis of the Differences in Energy Simulation Results Between Building Information Modeling (BIM)-Based Simulation Method and the Detailed Simulation Method", (Year: 2011).*
Dogan, T., et al., "Automated multi-zone building energy model generation for schematic design and urban massing studies", 2015. http://www.ibpsa.org/proceedings/eSimPapers/2014/5B.2.pdf.
"Disjoint-set data structure", Wikipedia, Jan. 1, 2015. http://en.wikipedia.org/wiki/Disjoint-set_data_structure.

* cited by examiner

COMPLETE ENERGY ANALYTICAL MODEL BUILDING INFORMATION MODELING (BIM) INTEGRATION

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/144,028, filed on Apr. 7, 2015, with inventor(s) John William Mitchell and Ian Patrick Molloy, entitled "Complete Energy Analytical Model Building Information Modeling (BIM) Integration,".

This application is related to the following co-pending and commonly-assigned patent application, which application is incorporated by reference herein:

U.S. patent application Ser. No. 11/670,260, filed on Feb. 1, 2007, by Jason Martin, Thomas Hans Ingemar Olsson, and Lev Minhovsky, entitled "Generating an Analytical Model of a Building for Use in Thermal Modeling and Environmental Analyses";

U.S. patent application Ser. No. 11/740,534, filed on Apr. 26, 2007, by Jason Martin, Thomas Hans Ingemar Olsson, and Lev Minhovsky, entitled "Generating an Analytical Model of Building for Use in Thermal Modeling and Environmental Analyses";

U.S. patent application Ser. No. 13/362,650, filed on Jan. 31, 2012, by Thomas Olsson, and John Mitchell, entitled "Building Envelope Determination";

U.S. patent application Ser. No. 13/250,213, filed on Sep. 30, 2011, by Kyle Bernhardt, Lillian M. Smith, Jack Conrad Gray, and Nathan Lockwood, entitled "Generating an Analytical Energy Model"; and U.S. patent application Ser. No. 13/605,743, filed on Sep. 6, 2012, by Lillian M. Smith, John F. Kennedy, Markus Bonn, Aryn Bergman, Ian Molloy, R. David Scheer, III, and Jing Lan, entitled "Generating Thermal Zones".

BACKGROUND OF THE INVENTION

1. Field of the Invention

The present invention relates generally to building information models (BIMs), and in particular, to a method, apparatus, and article of manufacture for automatically creating an accurate and reliable energy analytical model (EAM) from any combination of BIM elements, and for representing the EAM in BIM form so that it can be viewed, queried, and checked against the physical model.

2. Description of the Related Art

Three-dimensional (3D) Building Information Models (BIMs) today essentially comprise two key methods or objects used for defining and representing physical architectural building form: Conceptual Massing Elements (CMEs), and Architectural Building Elements (ABEs).

CMEs can be defined as being simple abstract representations of building mass, volume and surfaces comprising a single composite 3D solid, where all individual surfaces that form the boundary of the CME have zero thickness. These are typically used in the early stages of architectural design and for simple representation of surroundings buildings and other context. ABEs on the other hand can be defined as detailed representations of the individual physical components that a building comprises i.e. walls, floors, roofs, windows, ceilings, curtain panels etc. Unlike CMEs, ABEs represent the thickness as well as layers and other characteristics that describe the detailed physical and geometric form of the architectural elements. FIG. 1A illustrates a single CME type object and FIG. 1B illustrates multiple CMEs representing a whole building. Similarly, FIG. 2A illustrates example architectural building element (ABE) type objects, while FIG. 2B illustrates multiple ABEs representing a whole building.

In practice, as the architectural design process moves from concept to detail, these two elements are used in a virtually infinite number of ways to represent architectural building forms. FIG. 3 illustrates CME and ABE modeling from concept to detailed design (e.g., from CME model 302 to the ABE model 304, to the detailed resulting model 306). In addition to this complexity, the accuracy and completeness of BIM modeling can vary widely with the models, typically containing small inaccuracies between elements in the form of gaps, overlaps, and even omissions of elements in certain areas. FIG. 4 illustrates examples of typical architectural modeling inaccuracies and omissions (e.g., overlap 402, gap 404, omissions 406, etc.).

Energy Analytical Models (EAMs) on the other hand essentially comprise Spaces and Surfaces, where each Space represents a discrete volume of air inside a building (an office, atrium, hallway, living room, bedroom, etc.) and each Surface represents a path of heat transfer between two Spaces, or between a Space and the exterior environment. The critical aspects of an EAM that determine its accuracy or reliability are a suitable level of discretization (often referred to as thermal zoning) and the representation of each heat transfer surface's area, orientation and tilt. To date, while there are numerous methods for the creation of an Energy Analytical Model from a BIM, all of these impose severe restrictions on what elements the BIM comprises, on how they are combined and configured together, and on the accuracy and completeness of the BIM model.

Finally, to date there has never been a way to represent the EAM elements in BIM form—either only some simplified version of the EAM can be seen, or the EAM must be viewed in a $3^{rd}$-party application.

PRIOR ART EXAMPLE

The problems presented by the prior art may be described via the example of an analysis of the energy usage of a building. More specifically, prior art applications may analyze a building's energy usage using an analytic model (i.e., the EAM described above) from a 3D building model. Energy analysts typically start with a virtual 3D building model (e.g., a CME or ABE) (e.g., created with software such as AUTODESK REVIT™), and then use other software tools to manually construct a simplified EAM of the building that is suitable as input to the energy analysis tool (e.g., the GREEN BUILDING STUDIO™ tool (also known as the GBS™ tool) available from the assignee of the present invention). The EAM of the building represents the 3D spaces (e.g., rooms) explicitly, and it provides simplified representations of space-separating elements such as walls, floors, and roofs. The EAM must include relevant data such as the volumes of the 3D spaces and the areas and thermal properties of the space-separating elements. The manual creation of an EAM typically takes several days, and sometimes a couple of weeks. The energy analysis tool then uses this information to simulate the building's energy usage and to provide reports and comparisons of energy usages in different scenarios. This allows architects and energy analysts to enhance a building's energy usage, resulting in more "green" (energy-efficient) buildings.

The two main challenges in implementing an energy analysis tool are:

1. The determination of the 3D spaces defined by the building model; and
2. The determination of the "analytic faces" (an analytic face represents a geometrically and thermally uniform portion of a wall, floor, roof, etc., that separates two given 3D spaces). For example, one portion of a wall might separate a hallway on one side of the wall from a bedroom on the other side, while another portion of the same wall separates the hallway from a second bedroom. These two portions of the wall would be represented by two analytic faces.

3D building modelers such as the AUTODESK REVIT™ application typically do not model the 3D spaces explicitly, nor are analytic faces represented in the 3D model. Instead, the walls, floors, roofs, and other such building elements are represented explicitly and 3D spaces and analytic faces must be derived from the position and structure of the building elements. An important point is that it is not necessary to produce an "airtight" EAM in which the analytic faces meet without any gaps to bound the 3D spaces. Energy analysis tools such as GBS use discrete approximations to perform energy analyses, so small inaccuracies in the analytic model are acceptable. The creation of an airtight analytic model is generally quite difficult, because the 3D building model is itself often not entirely accurate (there may be small gaps, overlaps, etc.), and producing an exact analytic model would sometimes require resolving complex geometric conditions (surface tangencies, etc.). By contrast, what is needed are robust and fast methods for creating analytic models that are approximate, but accurate enough for the purposes of energy analysis.

SUMMARY OF THE INVENTION

All considered, embodiments of the invention provide a general method for the automatic creation of an accurate, reliable EAM from any combination of BIM elements, and a method for representing the EAM in BIM form so that it can be viewed, queried and checked against the physical model.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 5:
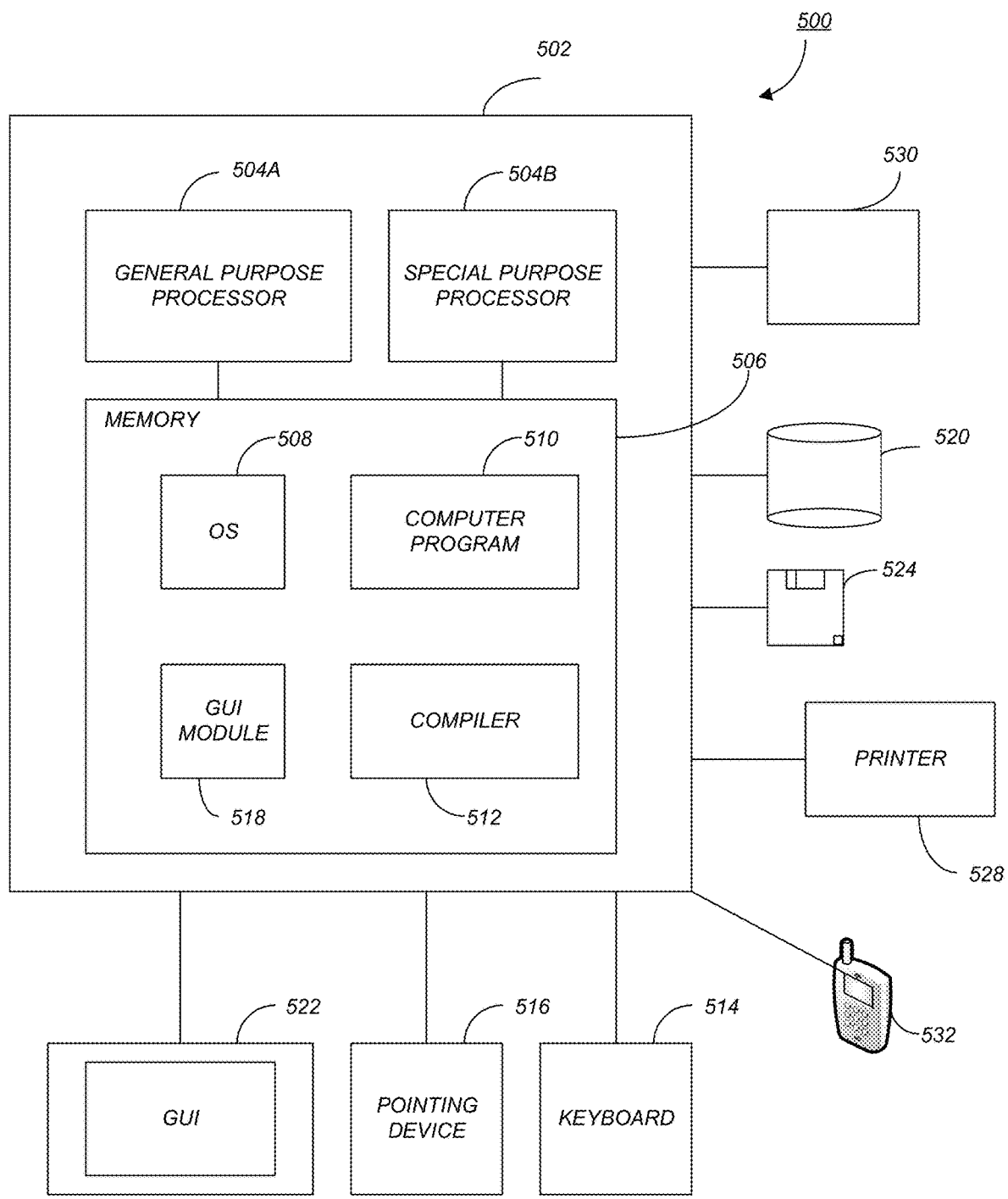
FIG. 5 is an exemplary hardware and software environment used to implement one or more embodiments of the invention.

FIG. 5 is an exemplary hardware and software environment 500 used to implement one or more embodiments of the invention. The hardware and software environment includes a computer 502 and may include peripherals. Computer 502 may be a user/client computer, server computer, or may be a database computer. The computer 502 comprises a general purpose hardware processor 504A and/or or a special purpose hardware processor 504B (hereinafter alternatively collectively referred to as processor 504) and a memory 506, such as random access memory (RAM). The computer 502 may be coupled to, and/or integrated with, other devices, including input/output (I/O) devices such as a keyboard 514, a cursor control device 516 (e.g., a mouse, a pointing device, pen and tablet, touch screen, multi-touch device, etc.) and a printer 528. In one or more embodiments, computer 502 may be coupled to, or may comprise, a portable or media viewing/listening device 532 (e.g., an MP3 player, IPOD™, NOOK™, portable digital video player, cellular device, personal digital assistant, etc.). In yet another embodiment, the computer 502 may comprise a multi-touch device, mobile phone, gaming system (e.g., PLAYSTATION 4, XBOX 360, XBOX ONE, WII U, etc.), internet enabled television, television set top box, or other internet enabled device executing on various platforms and operating systems.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508, to provide output and results.

Output/results may be presented on the display 522 or provided to another device for presentation or further processing or action. In one embodiment, the display 522 comprises a liquid crystal display (LCD) having a plurality of separately addressable liquid crystals. Alternatively, the display 522 may comprise a light emitting diode (LED) display having clusters of red, green and blue diodes driven together to form full-color pixels. Each liquid crystal or pixel of the display 522 changes to an opaque or translucent state to form a part of the image on the display in response to the data or information generated by the processor 504 from the application of the instructions of the computer program 510 and/or operating system 508 to the input and commands. The image may be provided through a graphical user interface (GUI) module 518. Although the GUI module 518 is depicted as a separate module, the instructions performing the GUI functions can be resident or distributed in the operating system 508, the computer program 510, or implemented with special purpose memory and processors.

In one or more embodiments, the display 522 is integrated with/into the computer 502 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 PLAYERS, NINTENDO 3DS™, PLAYSTATION PORTABLE™, etc.), touch tables, and walls (e.g., where an image is projected through acrylic and/or glass, and the image is then backlit with LEDs).

Some or all of the operations performed by the computer 502 according to the computer program 510 instructions may be implemented in a special purpose processor 504B. In this embodiment, the some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program 510 instructions. In one embodiment, the special purpose processor 504B is an application specific integrated circuit (ASIC).

The computer 502 may also implement a compiler 512 that allows an application or computer program 510 written in a programming language such as COBOL, PASCAL, C++, FORTRAN, or other language to be translated into processor 504 readable code. Alternatively, the compiler 512 may be an interpreter that executes instructions/source code directly, translates source code into an intermediate representation that is executed, or that executes stored precompiled code. Such source code may be written in a variety of programming languages such as JAVA™, PERL™, BASIC™, etc. After completion, the application or computer program 510 accesses and manipulates data accepted from I/O devices and stored in the memory 506 of the computer 502 using the relationships and logic that were generated using the compiler 512.

The computer 502 also optionally comprises an external communication device such as a modem, satellite link, Ethernet card, or other device for accepting input from, and providing output to, other computers 502.

In one embodiment, instructions implementing the operating system 508, the computer program 510, and the compiler 512 are tangibly embodied in a non-transitory computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of computer program 510 instructions which, when accessed, read and executed by the computer 502, cause the computer 502 to perform the steps necessary to implement and/or use the present invention or to load the program of instructions into a memory 506, thus creating a special purpose data structure causing the computer 502 to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 502.

Figure 6:
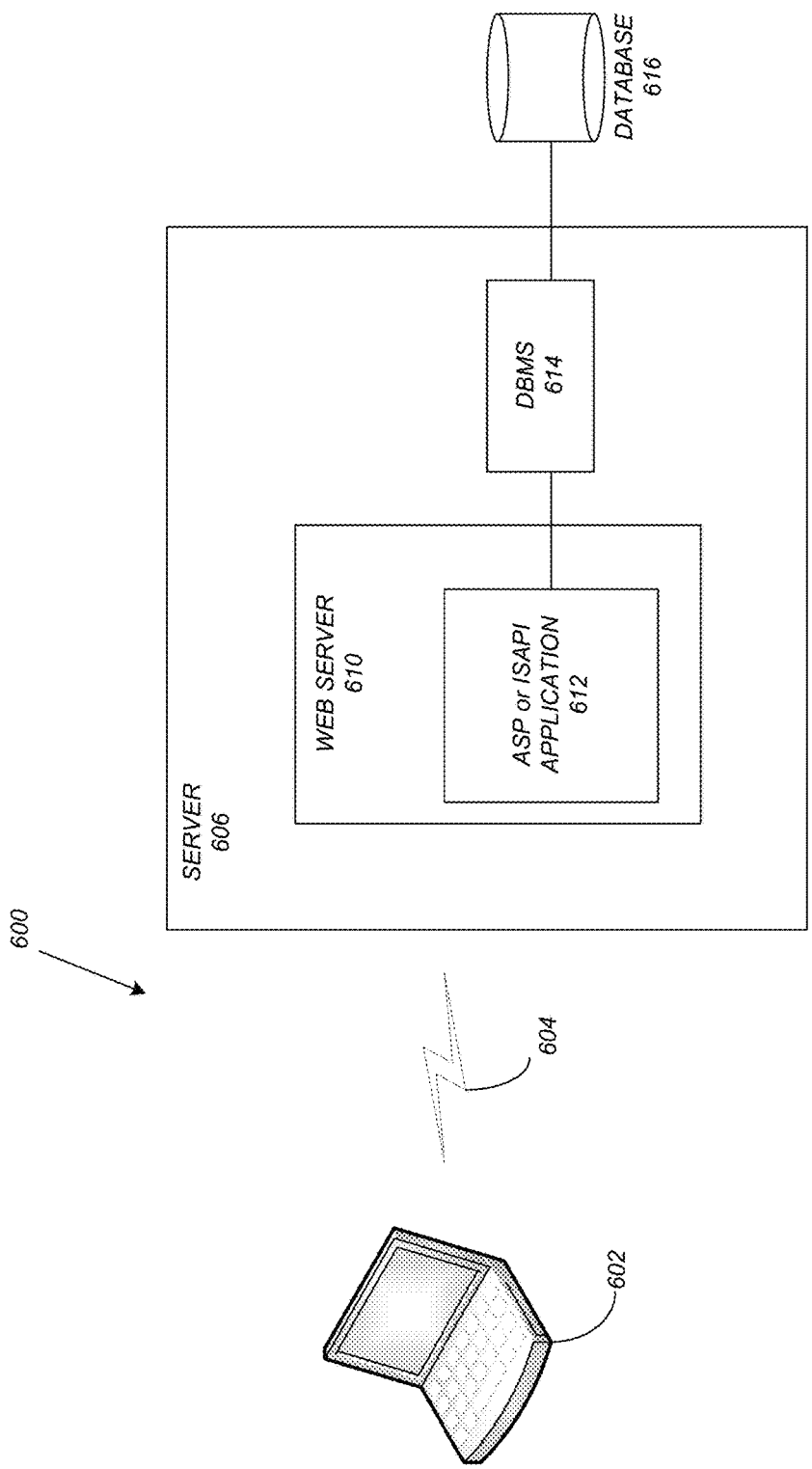
FIG. 6 schematically illustrates a typical distributed computer system using a network to connect client computers to server computers in accordance with one or more embodiments of the invention.

FIG. 6 schematically illustrates a typical distributed computer system 600 using a network 604 to connect client computers 602 to server computers 606. A typical combination of resources may include a network 604 comprising the Internet, LANs (local area networks), WANs (wide area networks), SNA (systems network architecture) networks, or the like, clients 602 that are personal computers or workstations (as set forth in FIG. 5), and servers 606 that are personal computers, workstations, minicomputers, or mainframes (as set forth in FIG. 5). However, it may be noted that different networks such as a cellular network (e.g., GSM [global system for mobile communications] or otherwise), a satellite based network, or any other type of network may be used to connect clients 602 and servers 606 in accordance with embodiments of the invention.

A network 604 such as the Internet connects clients 602 to server computers 606. Network 604 may utilize ethernet, coaxial cable, wireless communications, radio frequency (RF), etc. to connect and provide the communication between clients 602 and servers 606. Clients 602 may execute a client application or web browser and communicate with server computers 606 executing web servers 610. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 602 may be downloaded from server computer 606 to client computers 602 and installed as a plug-in or ACTIVEX™ control of a web browser. Accordingly, clients 602 may utilize ACTIVEX™ components/component object model (COM) or distributed COM (DCOM) components to provide a user interface on a display of client 602. The web server 610 is typically a program such as MICROSOFT'S INTERNET INFORMATION SERVER™.

Web server 610 may host an Active Server Page (ASP) or Internet Server Application Programming Interface (ISAPI) application 612, which may be executing scripts. The scripts invoke objects that execute business logic (referred to as business objects). The business objects then manipulate data in database 616 through a database management system (DBMS) 614. Alternatively, database 616 may be part of, or connected directly to, client 602 instead of communicating/obtaining the information from database 616 across network 604. When a developer encapsulates the business functionality into objects, the system may be referred to as a component object model (COM) system. Accordingly, the scripts executing on web server 610 (and/or application 612) invoke COM objects that implement the business logic. Further, server 606 may utilize MICROSOFT'S™ Transaction Server (MTS) to access required data stored in database 616 via an interface such as ADO (Active Data Objects), OLE DB (Object Linking and Embedding DataBase), or ODBC (Open DataBase Connectivity).

Generally, these components 600-616 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 602 and 606 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 602 and 606.

Software Embodiment Overview

Embodiments of the invention are implemented as a software application on a client 602 or server computer 606. Further, as described above, the client 602 or server computer 606 may comprise a thin client device or a portable device that has a multi-touch-based display.

Virtual Elements

In order to handle different kinds of building models in a uniform way when creating an EAM, the input model, which may consist of a combination of ABEs and CMEs, is first passed through a pre-processing stage that analyzes and extracts relevant information from the model (e.g., surfaces, material/thermal properties) and constructs "virtual elements" that encapsulate that information. The remainder of the method creates the EAM by processing these virtual elements, without needing to "understand" the diverse ways in which ABEs and CMEs represent building elements and mass models. The use of such virtual elements makes the creation of an EAM easy to extend to new situations involving building models represented in other ways, and it also allows the use of a common approach for finding Spaces and (analytic) Surfaces for a model that contains both ABEs and CMEs, including when modeling inaccuracies are present.

Some of the technical aspects of this use of "virtual elements" are:

1. A C++ class called AVVirtualElement that encapsulates relevant data for a CME, including:
    a. The main face of the CME (if the CME has an opening, the main face excludes the opening).
    b. The complementary face of the CME (if the CME has an opening, this is the portion of the main face apart from the opening).
    c. The CME's category (is it a conceptual wall, roof, floor, etc.?).
    d. The level (i.e., a story), if any, associated with/to the CME (e.g., is a wall on the first floor, second floor, etc.).
2. The use of a C++ class called AVElemId that serves as a uniform identifier for an ABE or a CME.
3. The use of a C++ class called AVPanelManager that "understands" the structure of both ABEs and CMEs and can extract relevant information for use by the rest of the method. For example, the AVPanelManager can provide a list of faces (a.k.a. trimmed surfaces) for any given element that define the element's 3D shape, as a well as a separate list of faces to be used in constructing Surfaces.

For example, for a hip roof with four sloped segments (an ABE), the AVPanelManager might provide just the four top faces for use in constructing Surfaces, since that simplified geometry is sufficient for defining the thermal interface between the spaces on either side of the roof; for a rectilinear Conceptual Mass, on the other hand (a CME), the AVPanelManager would recognize the top plane of the Mass as "roof-like" and would provide that face for use in constructing Surfaces. In this way, the main method/system relies on the AVPanelManager to "interpret" the geometry of any given element, be it an ABE or a CME, allowing the rest of the method/system (including other functions of AVPanelManager) to proceed in a uniform way to determine the spatial structure and the Surfaces for the given building model.

A few of the many functions that benefit from this unified treatment of ABEs and CMEs are:

a. getPanelFacesForPointCloudGeneration: This function returns the faces to be used in determining how a given element, whether an ABE or a CME, affects the building's spatial structure.
b. getAGPanelDataIdsAssociatedToPanelDataIds: This function returns the faces to be used in constructing Surfaces on a given element, whether an ABE or a CME.
c. getAnalyticHostFacePositioningInfoForPanel: This function determines how a Surface should be positioned with respect to the ABE or CME to which it is associated. For example, a Surface on a wall (an ABE) may be positioned along the center plane of the wall, whereas a Surface on a Conceptual Mass wall would be positioned coincident with the plane of that CME wall.

Point-Cloud Representation of Building Elements

A second novel aspect of the method is the use of discrete sets of points in 3D space, distributed over the boundary faces of a building element or Conceptual Mass, to provide a coarse but efficient representation of the building model for the purpose of analyzing the building's spatial structure. This approach has a few advantages versus using the building geometry directly:

The building's spatial structure is determined using a 3D voxel grid, as outlined below. Finding the voxel that contains a particular point in the point-set used to represent an ABE or CME is a fast and robust operation, and this contributes to the overall method's speed and robustness.

This approach makes the method/system flexible, since new types of building elements can be incorporated into the method/system without needing to change the part of the method/system that analyzes the spatial structure (since that part only sees the point-sets).

Certain mathematical theorems can be used in choosing how to distribute points over the boundary faces of an ABE or CME, without regard to the particular type of building element. These theorems help ensure that the building's spatial structure will be accurately reflected in the voxelized space model, and that small gaps between building elements (such as a gap between a wall and roof in the Revit model) do not cause "space leaks"—the mistaken identification of two spaces that should be represented as separate 3D spaces.

Figure 7:
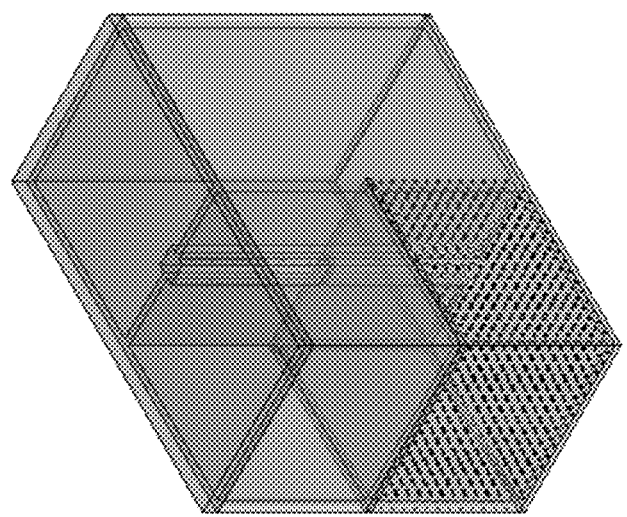
FIG. 7 illustrates an exemplary point cloud where points are only shown on two boundary faces (for clarity) in accordance with one or more embodiments of the invention.

The discrete set of points that are utilized may comprise a point cloud. FIG. 7 illustrates an exemplary point cloud where points are only shown on two boundary faces (for clarity) in accordance with one or more embodiments of the invention.

Voxel Space Model for a Mixed Building Model (ABEs and CMEs)

A third novel aspect of the method is the use of a discretization of space, based on a 3D cubical lattice, in analyzing the Spaces that are implicitly defined by the building model. This approach allows a uniform and consistent determination of the Spaces, whether a Space is defined by a combination of ABEs, by a single CME, or by a combination of ABEs and CMEs. This can be contrasted with the methods covered by the prior art (see the cross-reference section above), which deal with either ABEs or CMEs, but not a combination of both types. It can also be contrasted with methods studied in the industry, such as the approach described in the paper "Automated multi-zone building energy model generation for schematic design and urban massing studies" by Timur Dogan, Christoph Reinhart, and Panagiotis Michalatos (available at http://www.ibpsa.org/proceedings/eSimPapers/2014/5B.2.pdf on Jan. 27, 2015), which is incorporated by reference herein. This paper presents a robust method for determining Spaces and Surfaces, but it assumes that the building model is represented as a CME, and is not easily extendable to a method that handles both ABEs and CMEs.

Figure 8:
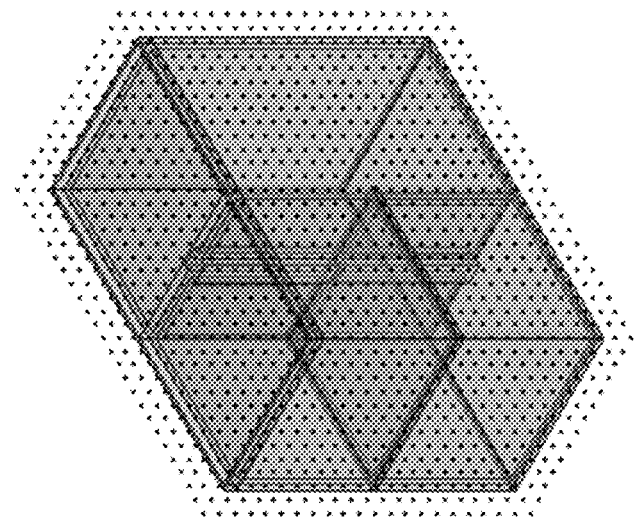
FIG. 8 illustrates an exemplary voxel model with dots representing voxels in a 3D voxel grid (each dot lies at the center of a voxel) in accordance with one or more embodiments of the invention.

FIG. 8 illustrates an exemplary voxel model with dots representing voxels in a 3D voxel grid (each dot lies at the center of a voxel) in accordance with one or more embodiments of the invention. As used herein, a voxel represents a value on a regular grid in a 3D space.

Pixelated Surfaces

A fourth novel aspect of the method is the use of a 2D discrete approximation of the geometry of Surfaces. This avoids the need to deal with geometric problems that can be difficult to make robust and can cause computational slowdowns.

Figure 9:
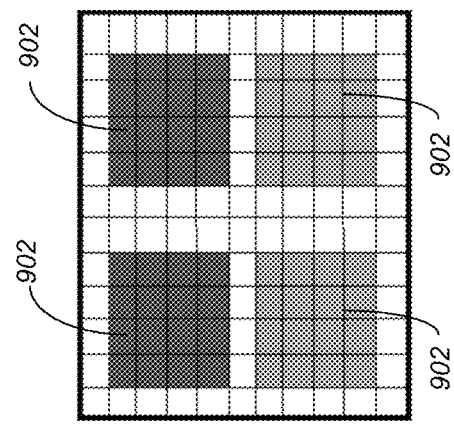
FIG. 9 illustrates an exemplary pixel grid consisting of a 2D grid in the uv coordinate plane of a face, with some "pixelated regions" shown in color in accordance with one or more embodiments of the invention.

For example, for an exterior wall (an ABE), there may be interior walls that abut the given wall, columns adjacent to it, and perhaps a CME wall that fully or partially overlaps the exterior wall. Trying to analyze the geometry of this situation precisely, taking into account the exact shapes of all the relevant elements would involve many complex operations (Boolean operations, face unions, differences, or intersections, etc.). These complex computations would slow down the overall method/system, and geometric inaccuracies in the model (which are unavoidable for various reasons [such as sloppy imported data]) would inevitably cause some failures for these complex operations. By contrast, embodiments of the invention use a discrete approach that proceeds roughly as follows:

To determine the Surfaces lying on a given portion of a building element (ABE or CME), first define a rectangular grid in the 2D coordinate plane for the representative face of that portion of the element (this representative face is one of the faces returned by the function getAGPanelDataIdsAssociatedToPanelDataIds mentioned previously). As used herein, this rectangular grid is called a "pixel" grid, and the cells are called "pixels", because of the similarity with the "pixels" of a computer monitor. FIG. 9 illustrates an exemplary pixel grid consisting of a 2D grid in the uv coordinate plane of a face, with some "pixelated regions" 902 in accordance with one or more embodiments of the invention.

For each pixel, move to either side of the representative face, examining the 3D voxels as one passes through, until a (voxelized) Space is reached. Keep track of the building elements passed through on the way to reaching a Space (for each of the two sides of the representative face).

Decide if the current pixel should be part of a Surface for the given portion of a building element. This will be true if there are no other building elements between the given element and the two Spaces on either side of the representative face, or if all such elements are "sandwiched" with the given element (so that they can be treated as a single, composite building element).

If the current pixel should not be part of a Surface, skip it and go on to process the next pixel in the 2D pixel grid (the pixels are processed in some orderly fashion).

For a pixel that should be part of a Surface, assign an integer "label" to the pixel that encodes information needed to determine which eventual Surface the pixel will be part of. In the most common case, the label encodes which pair of Spaces lie on either side of the representative face; if the given building element is sandwiched, as described above, the label also encodes the ids of the sandwiched elements, for later use. The encoding is implemented via a simple table, with the "label" being an integer index (i.e., row number) into the table, and with each row of the table storing the appropriate information.

Once all pixels have been labeled, an efficient method/system is used to determine the connected sets of pixels having the same label; these provide a coarse approximation of the Surfaces associated to the given portion of a building element. For example, if a wall has the exterior Space on one side, and two different Spaces on the other side, say a bedroom adjacent to one portion of the wall and a living room adjacent to the rest of the wall, embodiments of the invention will produce two (pixelated) Surfaces, one separating the bedroom from the exterior Space and the other separating the living room from the exterior Space.

A "refinement" step attempts to use all available information to "smooth out" the boundaries of the pixelated Surfaces, for both aesthetic and performance reasons.

Note how this approach allows the uniform handling of the construction of Surfaces for models containing both ABEs and CMEs. For example, the processing at this stage of a sandwich of two walls (ABEs) is the same as the processing of a sandwich of two Conceptual Mass walls, since the techniques described above provide this stage of the method/system with a unified view of the relevant geometry, whether it originated from ABEs, CMEs, or a mix of the two.

Figure 1A:
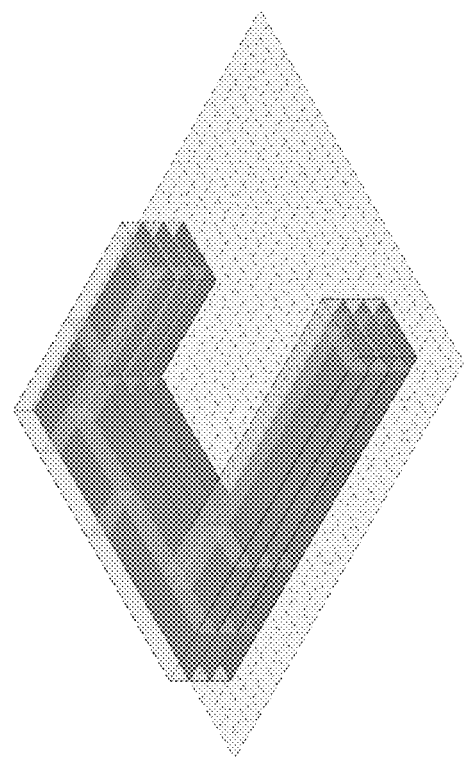
FIG. 1A illustrates a single CME type object.
Figure 1B:
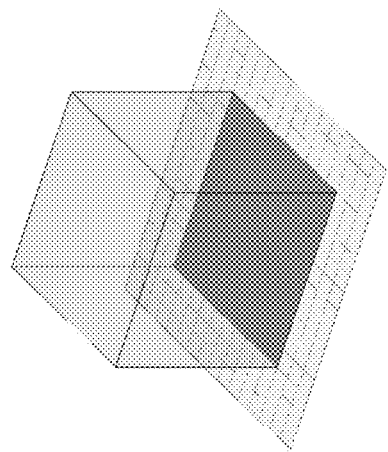
FIG. 1B illustrates multiple CMEs representing a whole building.
Figure 2A:
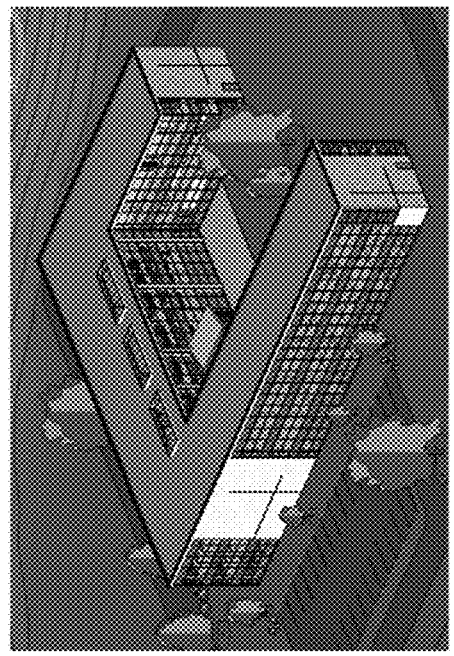
FIG. 2A illustrates example architectural building element (ABE) type objects.
Figure 2B:
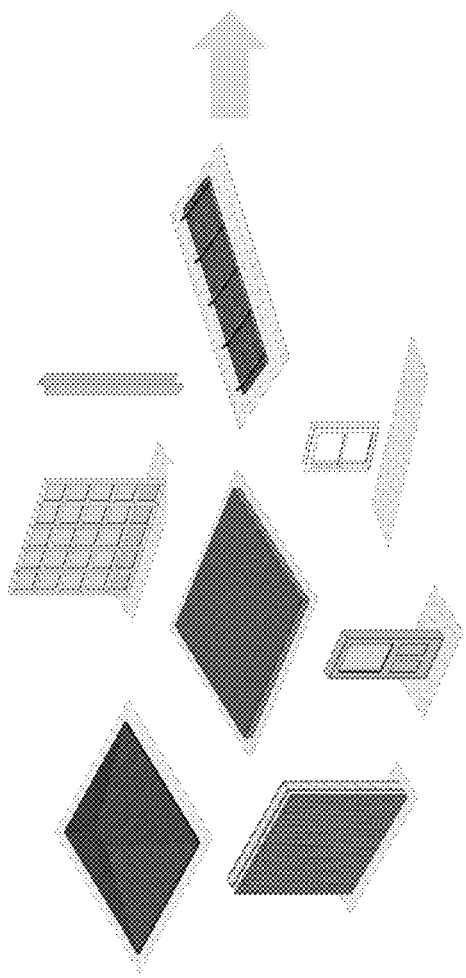
FIG. 2B illustrates multiple ABEs representing a whole building.
Figure 3:
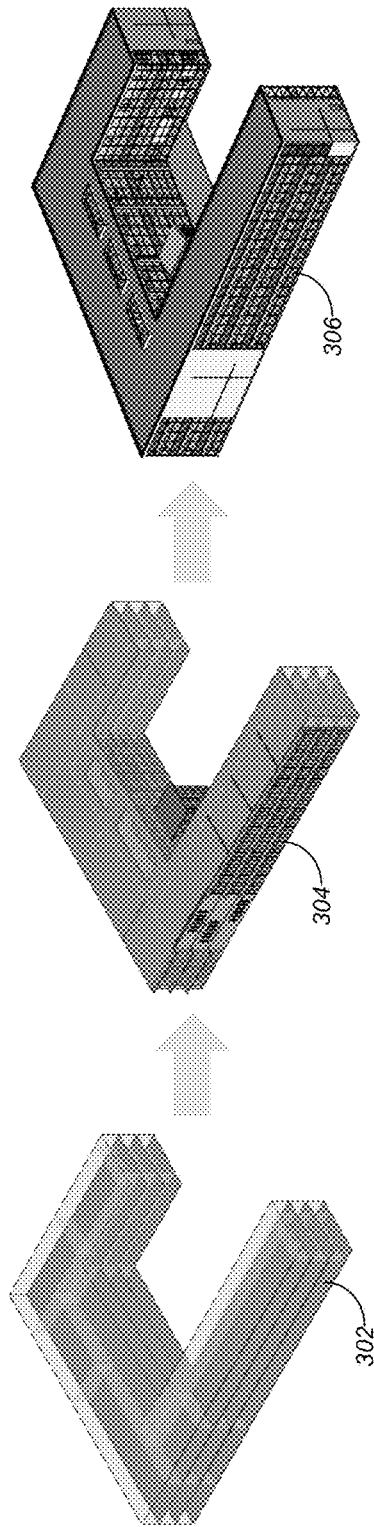
FIG. 3 illustrates CME and ABE modeling from concept to detailed design.
Figure 4:
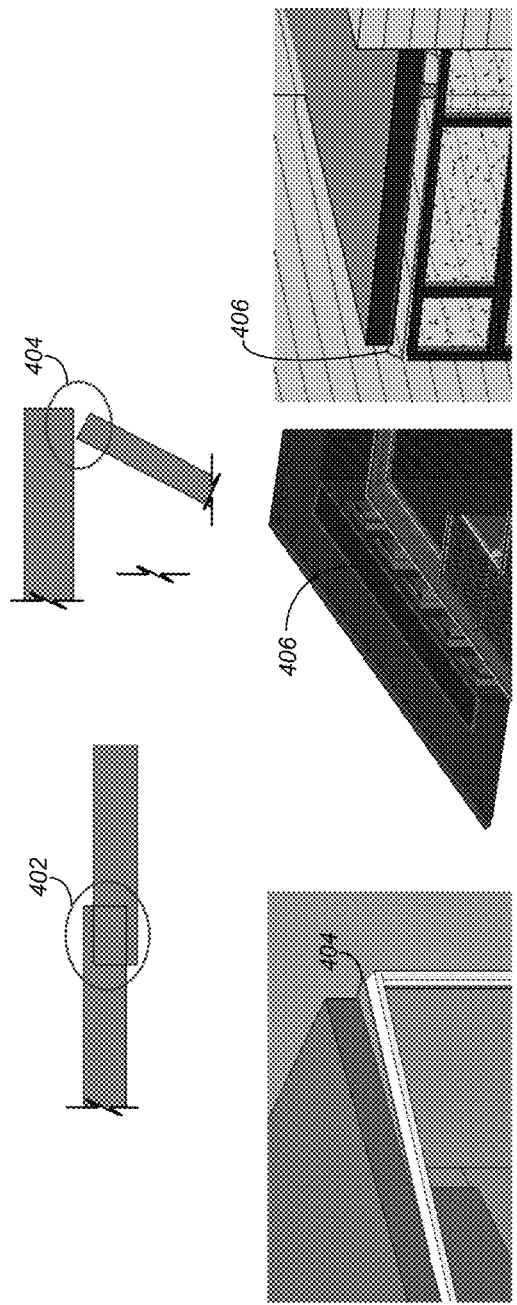
FIG. 4 illustrates examples of typical architectural modeling inaccuracies and omissions.

The intentional use of somewhat coarsely defined Spaces and Surfaces allows the method to avoid common pitfalls due to the fact, mentioned above, that the accuracy and completeness of BIM modeling varies widely across building models. Methods that attempt to produce "airtight" EAMs are likely to be plagued by problems with geometric inaccuracies, gaps, missing elements, and other such flaws in the building model (as illustrated in FIG. 4). Embodiments of the invention take advantage of the fact that the energy simulation tools do not require a precisely accurate, airtight EAM—using a discretization approach to represent the Spaces and Surfaces defined by an arbitrary combination of ABEs and CMEs yields a robust method that can produce sufficiently accurate EAMs at all stages of the building model's design evolution.

Thermal Zones

A fifth novel aspect of the method is the use of the 3D cubical lattice to further discretize EAM Spaces and Surfaces at the building perimeter in order to represent the differences in heat loss and gain that occurs throughout a building's exterior envelope at different times throughout the day (as the building moves around the sun). This greatly improves upon the prior art (as described in US Publication 2013/0066473) which addressed this same issue but was only applicable to CMEs and was prone to computational instability due to geometric complexity.

Figure 10:
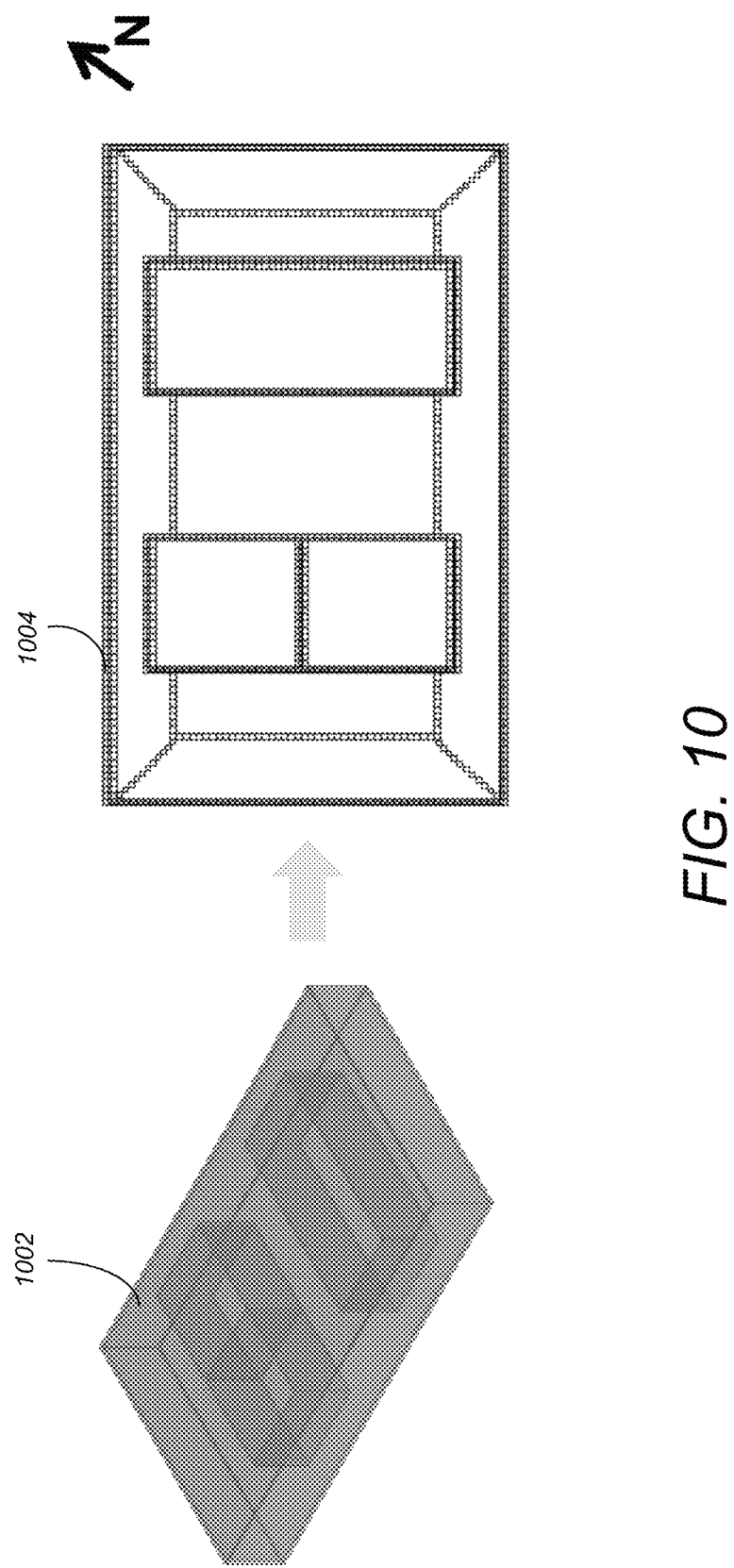
FIG. 10 illustrates an example of thermal zoning with the discretization of analytical spaces by perimeter and orientation using a voxel model in accordance with one or more embodiments of the invention.

In this regard, FIG. 10 illustrates an example of thermal zoning with the discretization of analytical spaces by perimeter and orientation using a voxel model in accordance with one or more embodiments of the invention. As illustrated, the input model 1002 has been discretized as can be seen at 1004 illustrating voxels representing the perimeters of the building elements.

BIM Representation

A sixth novel aspect of the method is its use of a BIM representation of the EAM within REVIT™ (an architectural CAD product [building design software] used to create the building model available from the assignee of the present application). Having the EAM represented within the overall BIM model in REVIT™, rather than in an external application, allows the designer to more easily examine and query the EAM, to update the building model if necessary before running the energy simulation, and even to use the BIM based EAM to present results from the energy simulation.

Logical Flow

Figure 11:
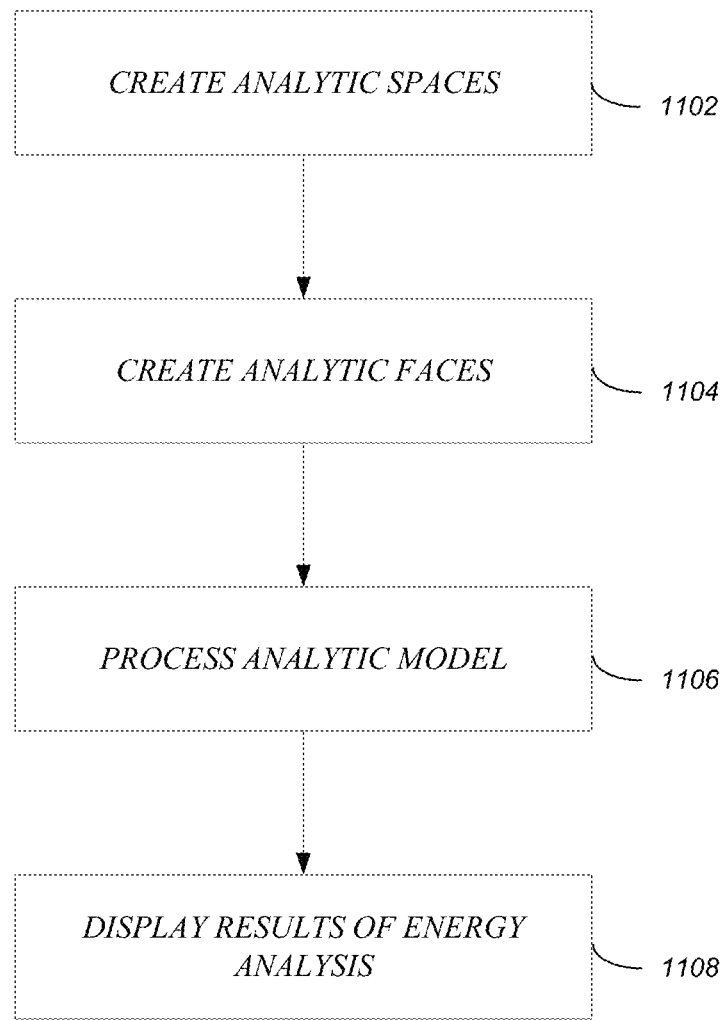
FIG. 11 illustrates the logical flow for performing the providing and utilizing an energy analysis model in accordance with one or more embodiments of the invention.
Figure 12:
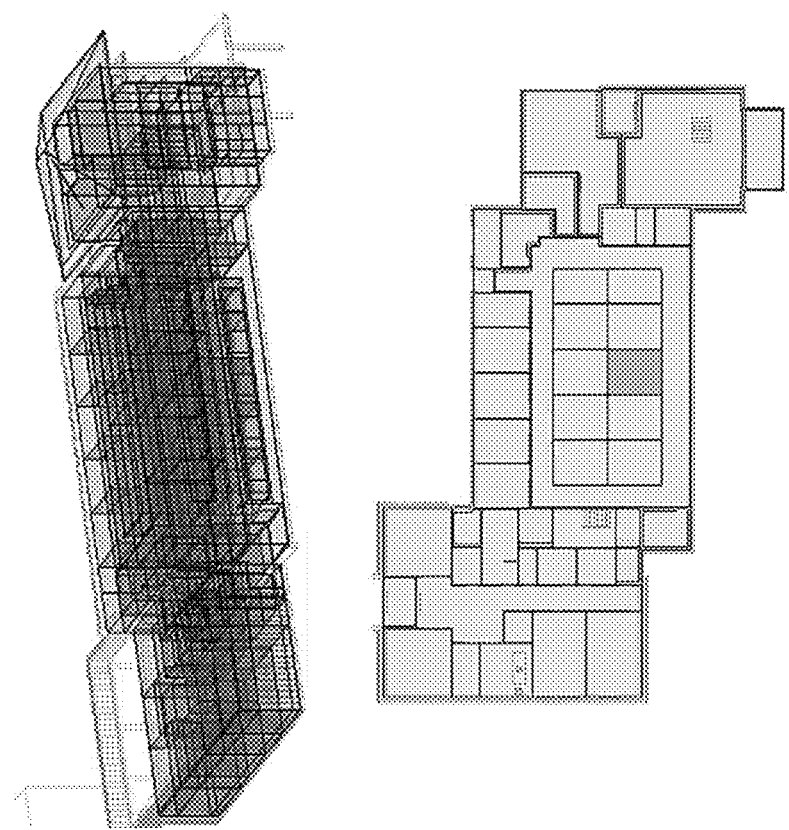
FIG. 12 illustrates examples of analytical spaces in accordance with one or more embodiments of the invention.

In view of the above, embodiments of the invention provide a tool for creating analytic models for energy analysis utilizing various basic stages. FIG. 11 illustrates the logical flow for performing the providing and utilizing an energy analysis model in accordance with one or more embodiments of the invention:

At step 1102, "analytic spaces" representing the 3D spaces in the building (rooms, the exterior space, etc.) are created. FIG. 12 illustrates analytic spaces in accordance with one or more embodiments of the invention.

Figure 13:
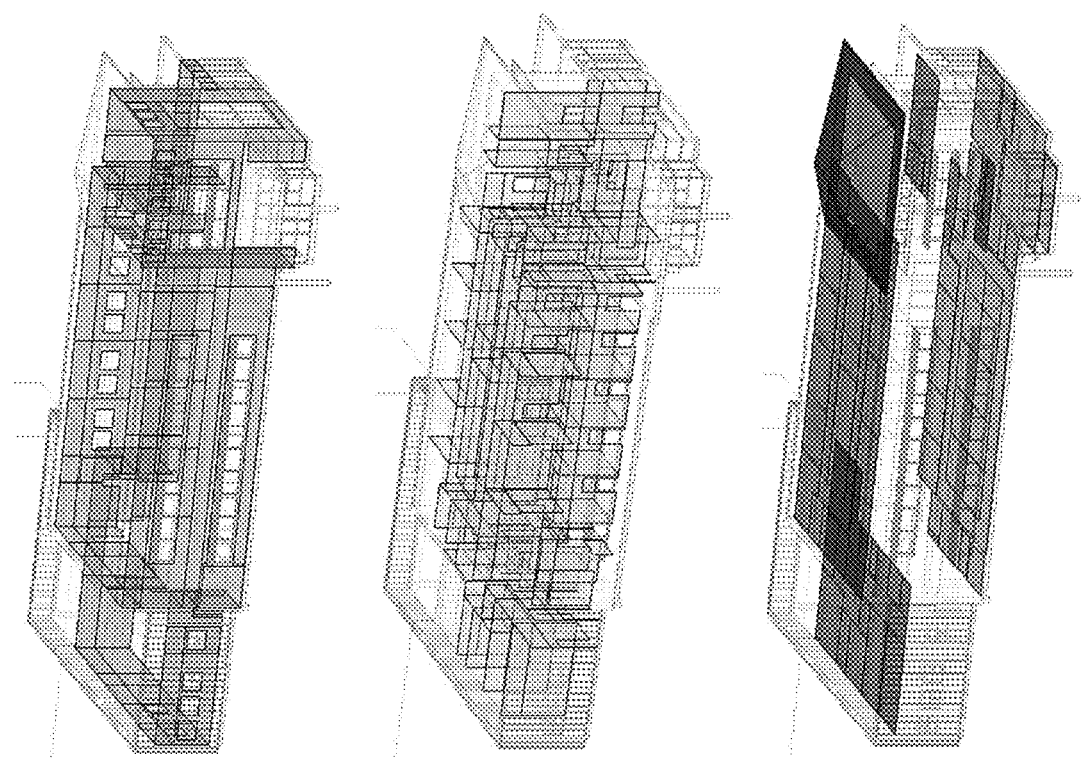
FIG. 13 illustrates examples of such analytical surfaces in accordance with one or more embodiments of the invention.

At step 1104, "analytic faces/surfaces" representing surfaces in the building are created. FIG. 13 illustrates analytic faces/surfaces in accordance with one or more embodiments of the invention.

At step 1106, the analytic model (analytic spaces and analytic faces) is processed to produce input for an external energy analysis tool (e.g., GBS).

At step 1108, the results of the energy analysis are displayed/output (e.g., via charts, graphs, etc.).

The determination of analytic spaces for the 3D building model may be conducted using voxel grids, point clouds, determining connected cluster of space voxels, and/or determining the density of point clouds (as described in further detail above and below).

The determination of analytic faces may be conducted via various steps as described below.

Determination of Analytic Spaces for a 3D Building Model

Voxel Grids

The approximate structure of the 3D spaces defined by a building model is found by using a 3D cubical grid, finite in each dimension. The 3D grid cells, called voxels, are cubes of fixed size. The grid is aligned with the model's coordinate system, and its dimensions and position are chosen so that the grid encompasses the entire building model. For each space in the building model (e.g., a room), embodiments of the invention determine the set of voxels that lie inside that space without touching any of the space's bounding elements (i.e., walls, floors, ceilings, etc., that define the boundary of the space in question). This collection of voxels will provide a discrete approximation of the 3D space. The resolution of this approximation can be controlled by adjusting the voxel size (i.e., the linear dimensions of the voxels), with smaller voxels providing more resolution.

Point Clouds

This approach as stated requires the determination, for each space-bounding element, of the set of voxels that intersect that element. This may be slow and difficult to make robust, particularly when the model includes curved elements (e.g., arc walls, curved roofs). Embodiments of the invention avoid these difficulties by approximating the space-bounding elements by point clouds. For example, the point cloud for a simple wall is a set of points lying on the six faces of the wall (top, bottom, front, back, and the two end faces), distributed densely enough for our purposes (see more details below). Embodiments can then quickly determine the set of voxels that intersect the wall's point cloud, by determining the voxel(s) containing each point in the cloud. All such voxels are called bounding voxels since they intersect space-bounding elements (roughly speaking). All other voxels are called space voxels, and embodiments of the invention are then left with the problem of determining the connected clusters of space voxels; such clusters are approximate representations of the building's 3D spaces.

Determining Connected Clusters of Space Voxels

Once each voxel has been labeled as either a bounding voxel or a space voxel, the connected clusters of space voxels are determined in an efficient way. Technically, a "connected cluster" of voxels is a maximal set of voxels with the property that any pair of voxels in the set may be connected by a sequence of voxels in the set so that consecutive voxels in the sequence share a common face.

There are various methods that can be used for this purpose. Embodiments of the invention use an approach that allows use of the "Disjoint sets" method, which is known to be a very efficient way to partition a set of objects (e.g., space voxels) into subsets (i.e., connected clusters of space voxels) in certain circumstances. This results in a method that is essentially maximally efficient.

Specifically, the 3D voxel grid is traversed, moving along the first coordinate direction (the x-coordinate), then along the y-coordinate, and then along the z-coordinate. Bounding voxels are skipped over. For a space voxel, the adjacent voxels in each of the three positive coordinate directions are examined. If one of these three neighboring voxels is also a space voxel, the Disjoint Sets method is "informed" that the current voxel and its neighbor belong to the same subset (i.e., the same connected cluster). When the traversal of the voxel grid is complete, the Disjoint Sets can then return the list of subsets that have been defined, which is the list of connected clusters of space voxels—the analytic spaces.

Besides being fast, this method is simple to implement, and so requires little or no maintenance.

Determining the Density of Point Clouds

In defining the point cloud for a space-bounding element (see above), it is important to choose points that are distributed densely enough to prevent space leaks. A space leak occurs when a 3D region that should be represented by two or more analytic spaces is represented by a single analytic space. This can happen if a chain of space voxels passes through a space-bounding element without touching any of the points in that element's point cloud. A leak from an interior space in a building to the exterior space (i.e., the outside world) is especially problematic since the interior space will then be treated as if it were outside the building (for the purposes of energy analysis).

It is desirable for the points in a point cloud for a space-bounding element to be rather dense, to avoid space leaks, but it is also desirable to limit the number of points in a point cloud, to avoid an excessively slow computations. Various novel geometric theorems may be used to form the basis of the method that defines point clouds on space-bounding elements. These theorems give precise conditions for the distribution of points that guarantee that spaces cannot leak through space-bounding elements. These theoretical conditions are concrete enough to be implemented efficiently in the software for all types of surfaces.

One such mathematical theorem which plays a fundamental role in the method is as follows.

Theorem 1: Suppose that P is a closed, planar polygon (without self-intersections) with sides of length at most L for some positive real number L. Let R denote a regular planar polygon (i.e., one with equal side lengths and angles) with the same number of sides as P, each of length L, and let D denote the distance from the center of R to any one of its vertices. Then every point within the planar region enclosed by P lies within distance D of some vertex of P.

This theorem is applied in the software in order to choose sets of "sample points" on the surfaces of space-bounding elements (walls, etc.) with sufficient density so as to avoid analytic spaces "leaking" through the elements. The basic idea is as follows.

If a voxelized space leaks through an element, there is a sequence of space voxels (i.e., voxels that do not intersect any sample point on the boundary of a space-bounding element) that connects the interior of an actual space to its exterior, with successive voxels in the sequence sharing a face (this follows from the way in which the voxelized spaces are defined). If the voxels (which are 3D cubes) have side length V, imagine a solid sphere of radius V/2 sitting within the first voxel of the sequence, which lies within the actual space under consideration. The sphere can be moved along the sequence of voxels while always remaining within the union of all voxels in the sequence, until it reaches the last voxel, lying outside the actual space under consideration. Since by assumption, none of the voxels in the sequence intersect any sample point (otherwise this sequence would not represent a "space leak"), the solid sphere never intersects any sample point. This implies that the distance from the moving sphere's center to the nearest sample point is always greater than the sphere's radius, which is V/2 (otherwise the nearest sample point would lie within the solid sphere). But the sphere must pass through some space-bounding element in order to move from the interior of the actual space under consideration to its exterior, so at some moment, the sphere's center must intersect the surface of a bounding element. At that moment, the sphere's center is a point on some face of a bounding element that has distance greater than V/2 from the nearest sample point on that face. We can ensure that this is impossible, and hence that space leaks through bounding elements are impossible, by using Theorem 1 to choose the sample points on each face of a bounding element to satisfy the following density condition: every point on the face has distance at most V/2 from some sample point.

The particular way in which Theorem 1 is applied to enforce the density condition depends on the type of face being processed. As an example, for simple surfaces such as planes and cylinders, the method chooses the sample points on the face as the vertices of a rectangular grid in the face's 2D parameter space (faces are parameterized, just as the Earth's surface is conventionally treated using latitude and longitude as coordinates). Theorem 1, applied to the case of a polygon with four sides (with corners being the 3D corners of any of the grid cells), tells us that if we choose the grid dimensions appropriately, every point in the polyhedral approximation of the face as defined by the grid will have 3D distance at most V/2 from some corner of the cell, so there will be no space leaks through the polyhedral approximation of the face. When this is done for all faces of all bounding elements, it ensures for all practical purposes that there are no space leaks through bounding elements.

The method also uses the following generalization of the Theorem 1 to help ensure that there are no space leaks through small gaps between objects:

Theorem 2: Suppose that P is a closed polygon (not necessarily planar) in 3D space without self-intersections. Let R denote a regular polygon as in Theorem 1. Then every point in the convex hull of P lies within distance D of some vertex of P (the convex hull of a set of points is the smallest convex set containing all the points).

As an example of the role played by this theorem, imagine two space-bounding elements, such as a wall and a roof, with a small gap between them (due to sloppy modeling, etc.). Considering the surfaces used to represent simplified versions of these two elements, one can imagine constructing a ruled surface between them to fill in the gap (the ruled surface is composed of line segments connecting the two surfaces, like a continuous series of ropes spanning a chasm which together form a surface over the chasm). If one defines sequences of sample points along the boundaries of the two surfaces, with the rulings (the ropes) connecting corresponding sample points on the two surface's boundaries, each pair of consecutive rulings then defines a (possibly non-planar) polygon with four sides (the two rulings and the two lines segments joining their end points). If the gap is sufficiently small (so the rulings are short) and if one chooses the sample points to be closely spaced, all four sides of each such polygon will be short, and Theorem 2 then provides that every point on the portion of the ruled surface lying between the two rulings under consideration lies within the required distance V/2 of some corner point. Since this is true of all the portions of the ruled surface, spaces cannot leak through the ruled surface, which effectively ensures that spaces cannot leak through the gap.

The geometric analysis used to derive the point cloud method may also be used to help prevent another type of space leak—leaks through actual gaps in the building model. For example, a building model may have a small gap between a roof and an exterior wall, so that the interior space on one side of the wall is actually contiguous with the exterior space. Nevertheless, the analytic model should distinguish these two spaces if the gap is sufficiently small. The use of a voxel grid in combination with the point cloud method helps to ensure that the analytic model is fairly immune to space leaks due to actual gaps in the model.

Note that the user can adjust the voxel size indirectly by setting a "space resolution" control. This gives the user some control over the tradeoff between speed and accuracy when computing the analytic model.

Determination of Analytic Faces for a 3D Building Model

The method that computes analytic faces for a 3D building model (see definitions above) makes use of the analytic spaces, whose computation was just described. Here, too, a discretization approach may be utilized for speed and robustness, relying on the fact that a perfectly accurate and airtight analytic model is not necessary. The following steps give an overview of this method:

1. For each space-bounding element (wall, floor, roof, etc.), choose a set of representative faces for the element that together provide a simplified model for the element's shape. For example, for a straight vertical wall, a single planar vertical face is used. For a hip roof, the four top faces of the roof are used as the set of representative faces.

2. For each representative face, define a two dimensional (2D) grid in the face's parameter space (in REVIT™, faces are parameterized, just as the surface of the earth is represented via latitude and longitude on maps). The 2D grid cells may be referred to as pixels, in analogy with the term voxels (not to be confused with pixels on a computer monitor).

3. Assign an integer label to each pixel based on the pair of analytic spaces on either side of the space-bounding element at the given pixel. Pixels that have the same pair of analytic spaces on either side will receive the same label (this method also keeps track of "sandwiched" elements such as two sandwiched walls that should be treated as a single wall for the purposes of energy analysis). Pixels that have other space-bounding elements on one or both sides will not be labeled.

4. At this stage, all pixels with a given label form one or more connected regions that give a discrete approximation of the analytic faces on the given space-bounding element which separate the given pair of spaces. Such "pixelated domains" may then be computed.

5. Once the pixelated domains have been computed, they are represented as analytic faces (e.g., in Revit™), with relevant information (such as thermal properties) about the space-bounding element in question stored along with the analytic faces.

6. The analytic faces as defined so far have jagged (or "pixelated") edges. For performance and aesthetic reasons, it is preferable to "refine" the boundaries of these faces to make them smoother when possible. A final step does this refinement. When refinement is not possible, the analytic face will be left pixelated. One advantage of this approach is its robustness—something useful is always acquired, even in cases when a highly accurate refined analytic face cannot be constructed. This approach also allows the enhancement of the method/system over time by enhancing the refinement process.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for providing a complete energy analytical model comprising:
   (a) acquiring an input model, wherein the input model comprises a combination of one or more architectural building elements (ABEs) and one or more conceptual massing elements (CMEs), wherein:
      (1) the ABEs comprise individual objects that represent individual physical components of a building without explicitly modeling 3D spaces for the input model;
      (2) the individual physical components comprise walls, floors, windows, and roofs;
      (3) the ABEs represent characteristics of physical and geometric forms of architectural elements of the building; and
      (4) inaccuracies between ABEs exist in the input model;
      (5) the CME comprises a representation of the input model as a single composite 3D solid;
   (b) pre-processing the input model, wherein the pre-processing:
      (1) extracts information from both the ABEs and the CMEs in the input model; and
      (2) constructs a virtual element that encapsulates the extracted information;
   (c) determining a discrete set of points in three-dimensional (3D) space, distributed over boundary faces of the ABEs or CMEs;
   (d) providing, using the discrete set of points, a representation of the input model that is used to analyze a spatial structure of the input model;
   (e) approximating a geometry of the input model utilizing a two-dimensional (2d) discrete approach;
   (f) based on the spatial structure and the approximated geometry of the input model, determining surfaces of the energy analytical model wherein the energy analytical model is not a precisely accurate airtight energy analytical model, wherein in a precisely accurate airtight energy analytical model analytic faces meet without any gaps to bound 3D spaces;
   (f) outputting the energy analytical model comprised of the spatial structure and the surfaces; and
   (g) simulating energy usage of a building represented by the energy analytical model.

2. The computer-implemented method of claim 1, wherein:
   the information comprises a surface and a material/thermal property.

3. The computer-implemented method of claim 1, wherein:
   the surface comprises a face of one or more of the CMEs or the ABEs.

4. The computer-implemented method of claim 1, wherein:
   the information comprises a category of one of the CMEs or one of the ABEs.

5. The computer-implemented method of claim 1, wherein:

the information comprises a level associated with one of the CMEs or one of the ABEs.

6. The computer-implemented method of claim 1, wherein:
the virtual element comprises a list of faces defining a three-dimensional (3D) shape and a separate list of faces used to construct surfaces.

7. The computer-implemented method of claim 1, wherein:
the discrete set of points comprises a point cloud.

8. The computer-implemented method of claim 1, wherein the providing the discrete set of points further comprises: determining the spatial structure of the input model using a 3D voxel grid.

9. The computer-implemented method of claim 8, further comprising:
utilizing the 3D voxel grid to discretize the spaces and surfaces of the energy analytical model at a perimeter of the input model to represent differences in heat loss and gain.

10. The computer-implemented method of claim 1, wherein the determining surfaces comprises:
defining a rectangular grid in a 2D coordinate plane for a representative face of one of the ABEs or one of the CMEs;
for each cell in the rectangular grid, moving to a side of the representative face, examining 3D voxels until a voxelized space is reached, while tracking the ABEs and CMEs passed through;
deciding if a current cell should be part of a surface;
if the current cell should not be part of the surface, process a next cell in the rectangular grid;
if the current cell should be part of the surface, encoding information needed to determine which surface the current cell will be part of; and
determining connected sets of cells having a same encoding, wherein connected sets of cells approximate the surfaces associated to a portion of one of the ABEs or CMEs.

11. The computer-implemented method of claim 1, further comprising:
utilizing a building information model (BIM) representation of the energy analytical model within a building design software application;
querying the energy analytical model, within the building design software application; and
updating the BIM representation before running an energy simulation.

* * * * *